April 26, 1949.  E. F. SHELL  2,468,121

TIRE RECAPPING MOLD

Filed Dec. 10, 1945

INVENTOR
ELWOOD F. SHELL
BY
ATTORNEY

Patented Apr. 26, 1949

2,468,121

UNITED STATES PATENT OFFICE 2,468,121

TIRE RECAPPING MOLD

Elwood F. Shell, San Francisco, Calif.

Application December 10, 1945, Serial No. 634,137

2 Claims. (Cl. 18—18)

(Granted under the act of March 3, 1883, as amended April 30, 1928; 370 O. G. 757)

This invention relates to a tire recapping mold, and more particularly to an adjustable mold which can be used in the recapping of tires of varying size.

In recapping tires, the new rubber which is to form the tread is positioned about the periphery of a tire which has been suitably pretreated, as by buffing. The tire with the new rubber properly positioned is then normally placed in a relatively heavy mold where heat is applied in sufficient quantity, and for a suitable interval, to vulcanize the new rubber in place, it forming the new tread on the tire. These molds, as stated, are relatively heavy and cumbersome, and have the further disadvantage that a given mold is limited to the treatment of tires of but one size.

Objects of my invention, accordingly, are to provide a mold useful in recapping tires; to provide a mold of this character which is light in weight and may be readily transported to a desired location by the operator; and to provide a mold which is adjustable for use with tires of widely varying size.

Other objects will become apparent from the following description and appended claims.

In accomplishing these and other objects of the present invention, I have provided improved details of structure, the preferred form of which is illustrated in the accompanying drawing, wherein.

Figure 1:
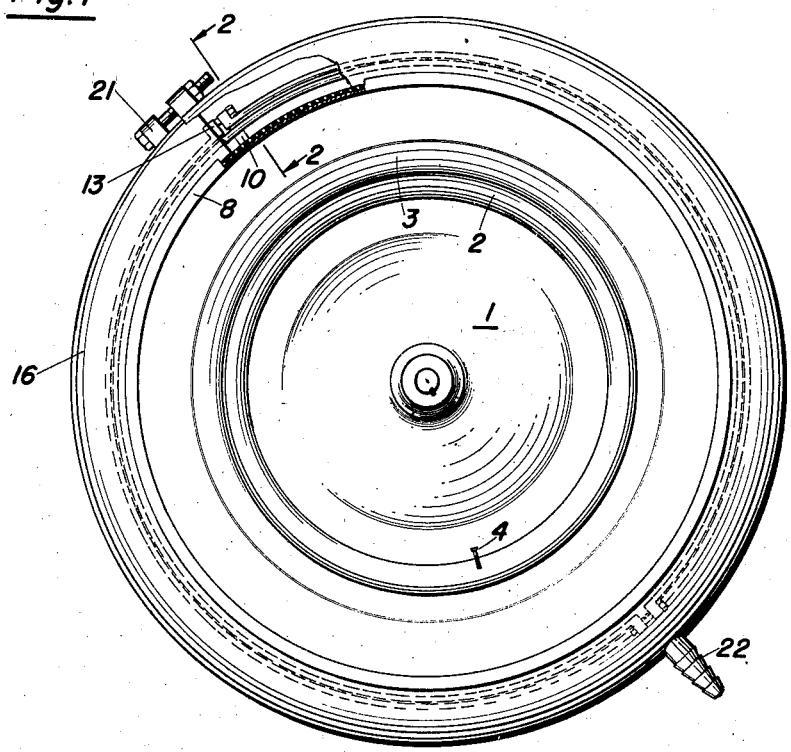
Fig. 1 is a view in elevation showing the mold apparatus embodying the features of the present invention applied to an inflated tire mounted on the rim of a wheel.

Referring more in detail to the drawing:

Shown at 1 is a tire wheel having a rim 2 on which is mounted an inflated tire 3, the air inlet valve on the tire being indicated at 4. The tire, which incorporates the tube 5 (Fig. 2), comprises the carcass and old tread portion 6 and the new rubber tread element 7 which is to be formed into place about the tire by heat treatment within the mold.

Figure 3:
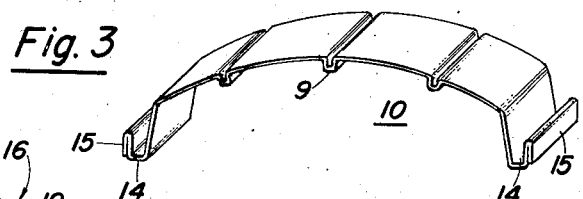
Fig. 3 is a view in perspective of a filler strip employed in the mold to enlarge the periphery thereof.

Extending about the periphery of the tire and overlying the exposed surface of the new tread element 7 is a broken circular matrix 8. The portions of the matrix in contact with the tire are inwardly curved, as viewed in cross section, and the inner surface of the matrix is embossed with the pattern to be impressed in the surface of the new tread element 7. In the form of matrix illustrated in the drawing, the embossing comprises a series of three annular ribs 9. It is a feature of the present invention that the matrix 8 is split in a transverse direction so that it may be spread as necessary to fit over a given tire. One or more matrix filler strips of varying size, one of which is illustrated at 10 (Fig. 3), are then inserted between the spread ends of the matrix in order that all portions of the new tread element 7 may be covered.

The matrix 8, including any filler strip or strips 10 that it may be necessary to employ, are locked tightly into position about the tire by means of one or more split lock rings 11. In the form of apparatus illustrated, three such lock rings are employed, and each ring carries an internal flange 12 which fits into reverse side of the ribs 9 in the matrix. Each lock ring is provided with a tightening clamp 13 comprising a threaded bolt fitted through eyes mounted on each end of the ring 11, a nut being threadably engaged on the bolt.

Each edge of the matrix 8 is turned upwardly to form an annular groove 14 adjacent each margin of the upper surface of the matrix. In addition, each of the upturned edges of the filler strip 10 is turned upon itself as at 15 to provide a wider abutting surface for engagement with the upturned edge portions of the matrix 8, thereby preventing overlapping of the matrix 8 and the filler strip 10 on tightening of the lock rings 11.

Fitted over the locked matrix elements on the tire is a steam jacket 16. This jacket comprises a broken circular member and is arcuate as viewed in cross section, the edge portions being shaped in a generally inwardly direction. The jacket 16 is complementary to the matrix 8, and to any matrix filler strips 10 employed therewith, in that edge portions 17 of the jacket fit into the grooves 14 provided in said matrix members. That a tight fit may be obtained between the jacket and the matrix, it is preferable that the said grooves 14 be provided with a rubber liner 18, which may conveniently be a circular band of rubber, as that cut from an inner tube, which is stretched about the matrix in said grooves.

Figure 2:
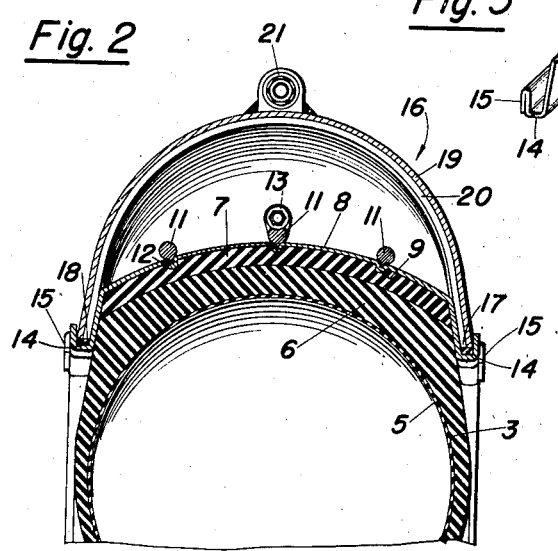
Fig. 2 is a view in cross-section of the apparatus taken along the line 2—2 in Fig. 1.

The circumference of the jacket 16 should be large enough to permit the ends thereof to overlap, the said overlapping ends being shown at 19 and 20 in Fig. 2. The said ends of the steam jacket are drawn over one another, and the jacket brought into tight engagement with the rubber liner 18, by means of a tightening clamp 21 comprising an eye mounted adjacent each end of the jacket and a bolt passing therethrough with a nut in threaded engagement therewith.

Steam is passed into jacket 16 through a nozzle 22, the steam being confined within the jacket except as it slowly exits between the overlapping ends 19 and 20 of the steam jacket.

Operation

The method of using the apparatus described above will now be described.

The tire to be recapped is prepared in the usual fashion and is then mounted, with a tube therein, on a suitable tire rim, after which it is inflated, an air pressure of from about 30 to 40 pounds normally being desired, though greater or lesser pressures may be used as long as the tire is placed in a firm condition. The matrix is then placed about the tire, and one or more matrix filler strips are selected and positioned between the ends of the matrix against the tire if the size of the tire is such as to prevent the matrix ends from touching after the lock rings 11 have been tightened. In any event, matrix elements should cover all portions of the newly added tread element 7. The lock rings are then positioned about the matrix and tightened into place, after which rubber liners 18 are fitted into the grooves 14.

The steam jacket 16 is then fitted about the matrix and is there tightened into position with the end portions 19 and 20 overlapping.

The assembly is then carried to the desired working position, where steam is introduced through the nozzle 22 in requisite amounts, and for the desired time interval, to effect correct vulcanization of the newly applied rubber element 7. At the end of this period, the steam is shut off, and the apparatus disassembled.

The new rubber element 7 is thereby properly vulcanized into position on the tire, a tread shape being impressed into the surface of the tire corresponding to the embossed portions on the inner surface of the matrix.

Due to the fact that the apparatus is adapted to the treatment of inflated tires, it is possible to eliminate the mold supports normally employed against the inner portions of the tire.

While I have shown but one embodiment of my invention, it is susceptible to modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. A tire recapping mold for recapping an inflated tire mounted on a rim, said mold comprising a transversely split, circular matrix, adapted to fit about the periphery of said tire, said matrix being shaped to form the new tread on said tire during the recapping process; a plurality of lock rings fitting about the periphery of said matrix and having clamp means arranged for tightening said rings about said matrix; and a transversely split, circular heating fluid jacket arranged to fit about the periphery of said matrix with the ends of said jacket in an overlapping position and with the edges of said jacket fitting in tongue and groove fluid-tight relation against adjacent edges of said matrix, said jacket and said matrix being so constructed and arranged as to provide an annular heating fluid chamber, generally crescent-shaped in cross-section, in which said matrix is in direct contact with heating fluid on its outer surface, said jacket having clamp means mounted thereon arranged for bringing said adjacent jacket and matrix edges into close engagement, and for causing the ends of said jacket to assume an overlapping position.

2. A tire recapping mold for recapping an inflated tire mounted on a rim, said mold comprising a transversely split, circular matrix member adapted to fit about a major portion of the periphery of a tire, said member being shaped to form the new tread on said tire during the recapping process and having an annular groove in the outer surface adjacent each edge thereof; at least one filler matrix member having the same general cross-sectional configuration as said circular matrix member and arranged to fit against the tire between spaced ends of said circular matrix member; a plurality of lock rings fitting about the periphery of said matrix members and having clamp means arranged for tightening said rings about said matrix members; a resilient liner secured in position at the bottom of each of said grooves in said matrix members; a transversely split, circular steam jacket arranged to fit about the periphery of said matrix members with the ends of said jacket in an overlapping position and with each edge of said jacket fitting against one of said resilient liners in said grooves, said jacket having clamp means mounted thereon arranged for bringing said jacket edges into close engagement with said resilient elements, and for causing the ends of said jacket to assume an overlapping position; and steam inlet means mounted on said jacket.

ELWOOD F. SHELL.

REFERENCES CITED

The following references are of record in the file of this patent:

UNITED STATES PATENTS

| Number | Name | Date |
|---|---|---|
| 1,356,597 | Byerley | Oct. 26, 1920 |
| 1,209,607 | Michelin | Dec. 19, 1916 |
| 1,600,586 | Hatfield | Sept. 21, 1926 |
| 1,620,435 | Burdette | Mar. 8, 1927 |
| 2,174,590 | Meier | Oct. 3, 1939 |

FOREIGN PATENTS

| Number | Country | Date |
|---|---|---|
| 427,284 | Great Britain | Apr. 18, 1935 |